United States Patent [19]

Sonderegger et al.

[11] Patent Number: 5,154,084
[45] Date of Patent: Oct. 13, 1992

[54] BEAM FORCE MEASURING SYSTEM FOR CYCLICALLY OPERATING MACHINES

[75] Inventors: Hans Sonderegger, Neftenbach; Peter Wolfer, Kleinandelfingen; Paul Brem, Wald, all of Switzerland

[73] Assignee: Kistler Instrumente AG, Winterthur, Switzerland

[21] Appl. No.: 708,375

[22] Filed: May 31, 1991

[30] Foreign Application Priority Data

May 31, 1990 [CH] Switzerland ............... 1838/90

[51] Int. Cl.⁵ .................................. F16B 31/02
[52] U.S. Cl. ..................... 73/761; 73/862.68; 73/1 B
[58] Field of Search ................. 73/761, 862.68; 310/338

[56] References Cited

U.S. PATENT DOCUMENTS 3,151,258 9/1964 Sonderegger et al. ......... 73/761 X

FOREIGN PATENT DOCUMENTS 237598 9/1987 European Pat. Off. ......... 73/862.68

Primary Examiner—Jerry W. Myracle
Attorney, Agent, or Firm—Barnes & Thornburg

[57] ABSTRACT

A beam force measuring system having a force sensor to be mounted to each beam of a cyclically operating machine between a force diverting part and a fastener which secures the beam. The sensor is disk shaped and has a height which is a fraction of the fastener. Disk shaped measuring elements are welded under preload to a metal disk of the sensor and have a common planar surface.

10 Claims, 4 Drawing Sheets

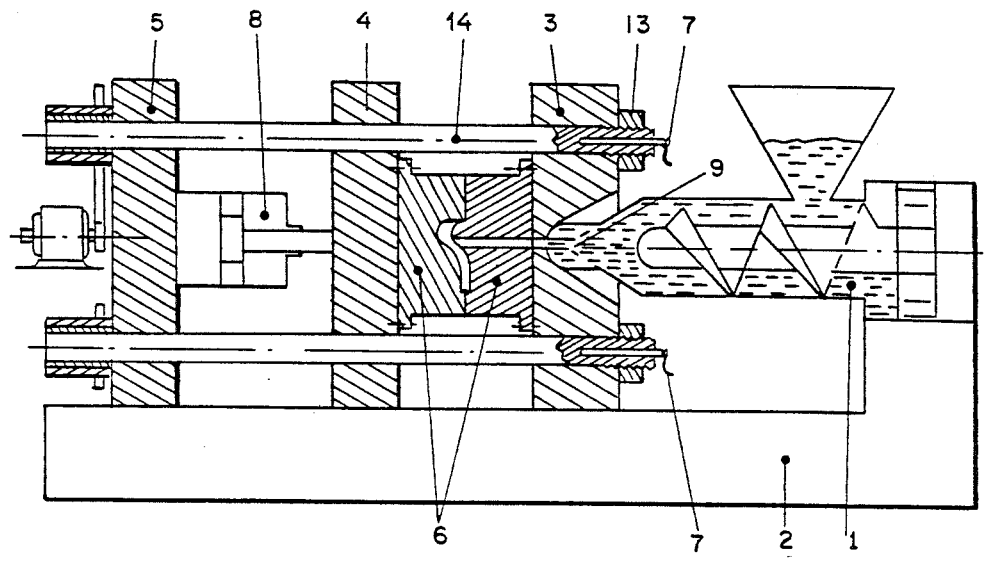
Fig. 1 STATE OF THE ART
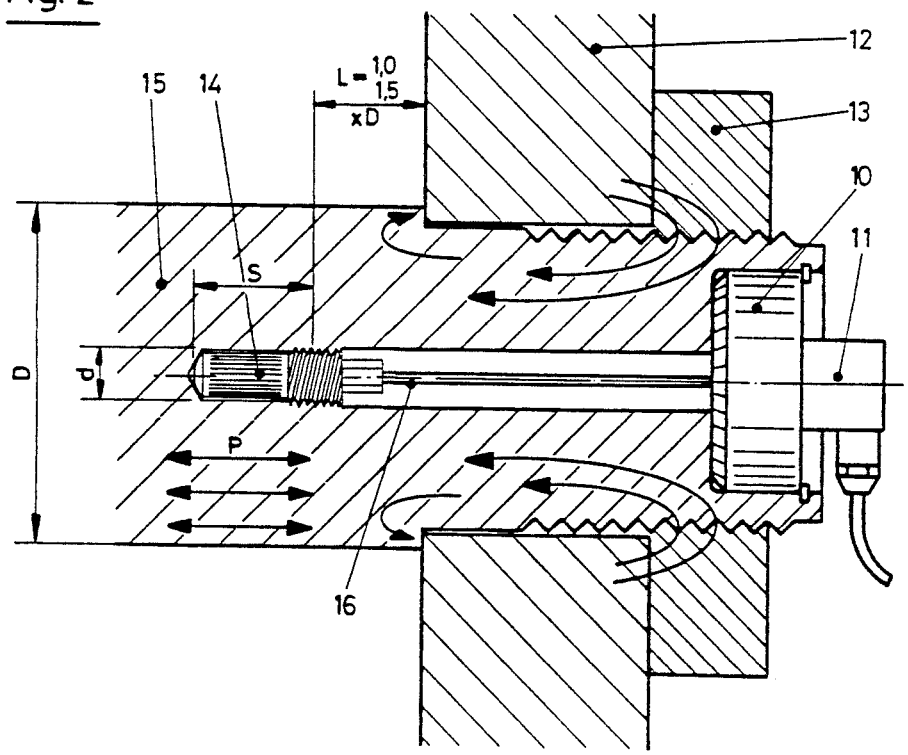
Fig. 2 STATE OF THE ART

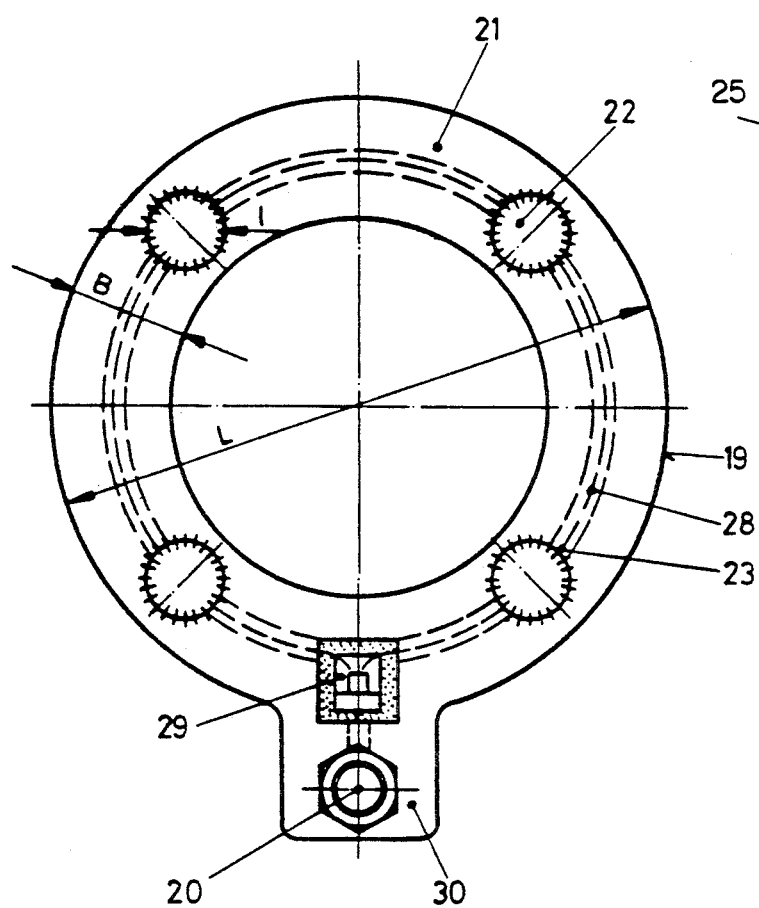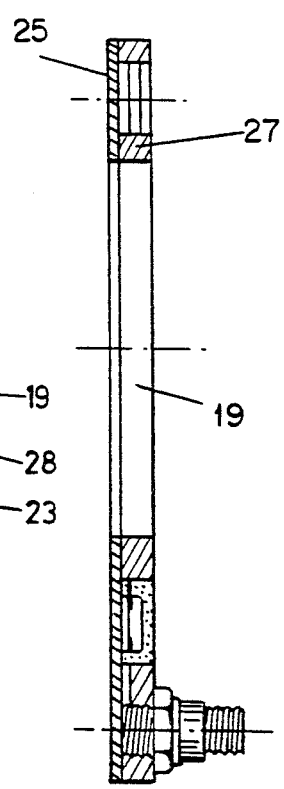

BEAM FORCE MEASURING SYSTEM FOR CYCLICALLY OPERATING MACHINES

BACKGROUND AND SUMMARY OF THE INVENTION

The invention relates to a beam force measuring system for cyclically operating machines such as injection molding machines.

The invention will be described principally to production machines in the plastics industry, especially to cyclically operating injection molding machines. It can, however, be applied also to presses, impact forming machines and in general, equipment where variable forces with large screw connections have to be monitored. The measuring system might thus be of importance in chemical process engineering.

To explain the invention in more detail, an injection molding machine will be taken as an example.

For monitoring a uniform injection process in the mass production of plastic parts, the pressure behavior in the injection mold is decisively important. The pressure curve in the mold is measurable via the change in the pressing together of the two mold halves in the usually four beams or tie bars of the machine. If the force pattern in the beams is known, a complete in-mold pressure curve can be derived automatically. In many cases, this variable can be used directly to control the injection screw. For intricate precision moldings where the pressure build-up must be followed at several points, special pressure sensors are fitted in the actual mold.

Various measuring methods are employed to detect the patterns of the clamping forces in the tie bars. All techniques for measuring on beam surfaces, like attaching strain gauges, are precluded because they obstruct the free movement of the mold carriers. Consequently, force measuring techniques have been developed which gauge the strain in the end bores of the tie bars. Their measuring outputs are located at the control ends of the tie bars.

In practice, long boreholes are needed in order to place the strain sensors properly in the zones of uniformly distributed tensile stress. Badly placed strain sensors give false measurements.

In many applications therefore, there is a need for a solution which does not require drilling the highly loaded tie bars. According to the invention, a thin disk sensor having a very low overall height is placed underneath the tie bar tightening nut. No mechanical alterations are necessary on the force transfer parts of the tie bars, so that the invention is equally suitable for original equipment and retrofitting.

According to the state of the art, with strain sensors in the bore, an absolute accuracy of the beam force around ±3% can be attained. With the thin disk sensor according to the present invention, the works-calibrated sensor may be evaluated direct, enabling accuracies of ±1%. A recalibration in the fitted state may point to jamming of the tie bars in the guiding frame, which must be corrected.

The invention provides new possibilities for monitoring the quality of the moldings and the machine functioning, without entailing mechanical alterations on important force-conducting parts. The invention is therefore suitable not only for new machines but especially for retrofitting on machines already in operation.

Other objects, advantages and novel features of the present invention will become apparent from the following detailed description of the invention when considered in conjunction with the accompanying drawings.

BRIEF DESCRIPTION OF THE DRAWINGS

FIG. 1 is a cross-sectional view of a state of the art injection molding machine with tie bar force measuring by strain transducers in boreholes;

FIG. 2 is a cross-sectional detailed view of state of the art strain gauging in borehole;

FIG. 6 is a cross-sectional view through thin disk arrangement according to the invention;

FIG. 7 is a plan view of thin disk arrangement of FIG. 6 according to the invention;

DETAILED DESCRIPTION OF THE DRAWINGS

Figure 3:
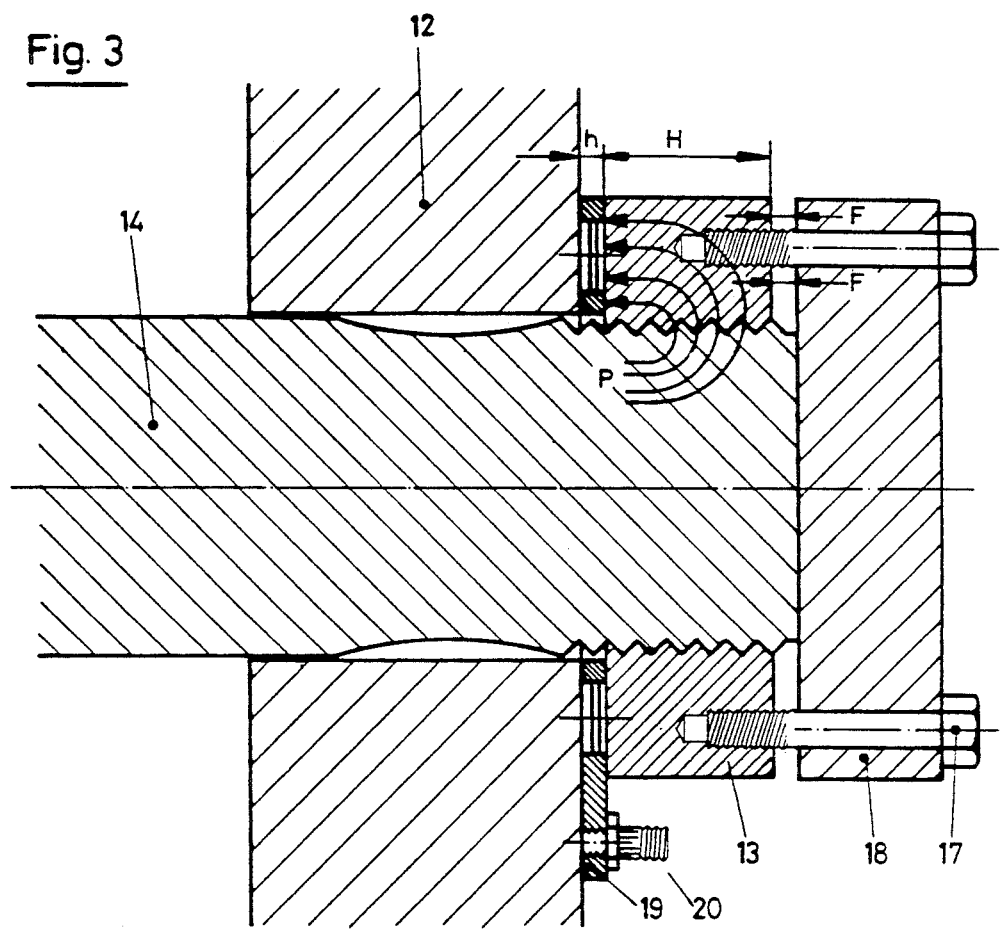
FIG. 3 is a cross-sectional view of a direct beam force measuring with thin disk arrangement according to the present invention.

FIG. 1 shows, schematically, an injection molding machine with a screw head in which the melt is heated and precompressed. Mounted on the machine frame 2 are fixed and moving parts of the machine. In the injection block 3, the screw head 1 ends with the nozzle 9. The mold 6 is mounted in the mold block 4. Accommodated on the stationary adjusting block 5 are the adjusting drives 8. Each tie bar 14 has a strain sensor 7 fitted in a borehole.

FIG. 2 shows a detail of a commercial, state of the art sensor installation. The elongation of the tie bar 14 is measured with the strain sensor 15 screwed in permanently. The extension length 'S' of strain sensor 15 amounts to a multiple of the diameter 'd'. The strain sensor 15 is connected with a preamplifier 10 via the cable connection 16. Connector 11 provides the link from the preamplifier 10 to a central control box. Strain sensor 15 must be placed at a depth where a distribution of the tension forces P is as homogeneous as possible. This is obtained with a distance $L = 1.0$ to $1.5 \times D$ where D is the diameter of the tie rod 14. In this example, the flange 12 of the injection block is fixed with a shoulder of the tie bar 14. Other designs lack this shoulder, because it has a considerable notch action.

FIG. 3 shows the answer to the beam force measuring problem offered by the present invention. The tie bar 14 extends through the flange part 12 of the injection block 3. A thin disk force sensor 19, has an overall height 'h' which is a fraction of the nut height H. H/6 to H/10 to has emerged as a practical height 'h' and is generally in the range of 6 to 8 millimeters. Owing to the low height 'h', the thin disk force sensor can be fitted without altering important, highly stressed parts. A preferred design provides the nut 13 with a mating flange is, which ensures with tension screws 17 that the nut 13 always lies on the same thread flanks in any load state, thus preventing nut 13 from coming loose. In this way, dangerous force alternation in the threads is avoided, and the nut locking demands no machining with notch effect or shoulder as in FIG. 2.

Figure 4:
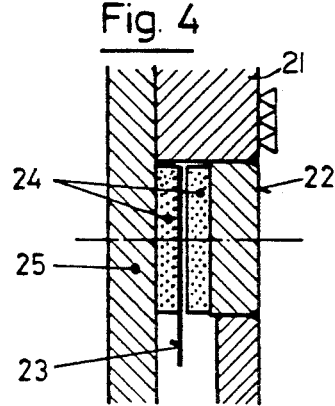
FIG. 4 is a cross-sectional view of a first embodiment force measuring element.

FIG. 4 shows a detail of the thin disk sensor 22 to be used in the housing of FIG. 7 according to the invention. The measuring element 22 with the piezo-crystals 24 and electrode 23 is welded under preload with the metal disk 21 and base disk 25.

After welding, the surface of the metal disk 21 is ground over at the same time as the oversized measuring element 22.

Figure 5:
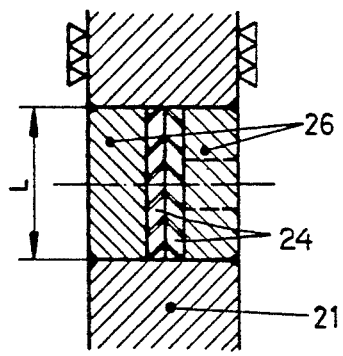
FIG. 5 is a cross-sectional view of a second embodiment force measuring element.

FIG. 5 shows a variant of FIG. 4. The measuring cell 22 is placed in a borehole 1 through the metal disk 21. The piezo-crystal disks 24 are welded under preload in the metal disk 21 between the cover plates 26. After welding, both surfaces are ground to vvv standard to define a common planar surface yielding exact force paralleling.

FIG. 6 shows a section through the thin disk force sensor 19 according to the invention in FIG. 7, revealing the design principle of FIG. 4 once again. The invention can be based on other variants, however.

FIG. 7 shows a plan view of the thin disk force sensor 19 according to the invention. By way of example, four measuring elements 22 are welded into the metal disk 21. The diameter "1" of the measuring elements 22 is in a ratio to the disk width 'B' and the overall diameter 'L'. The measuring elements 22 are paralleled forcewise to the metal disk 21, since the surfaces of the latter are exactly flat. Consequently the measuring elements 22 measure only a certain part of the total force P transmitted by the beam or the rod 14. The more measuring elements 22 used, the higher the measuring sensitivity. But because the measuring elements 22 are nearly as rigid as the solid metal disk 21 and the forces to be measured are very strong, even few measuring elements 22 give a much stronger measuring signal than is possible with strain sensors 14 according to FIG. 2. For impedance transformation or signal amplification, an amplifier 29 is built into the thin disk force sensor 19. It is connected with the individual electrodes 23 via the signal line 28. The connecting line runs via socket 20 fitted in the connecting part 30.

Figure 8:
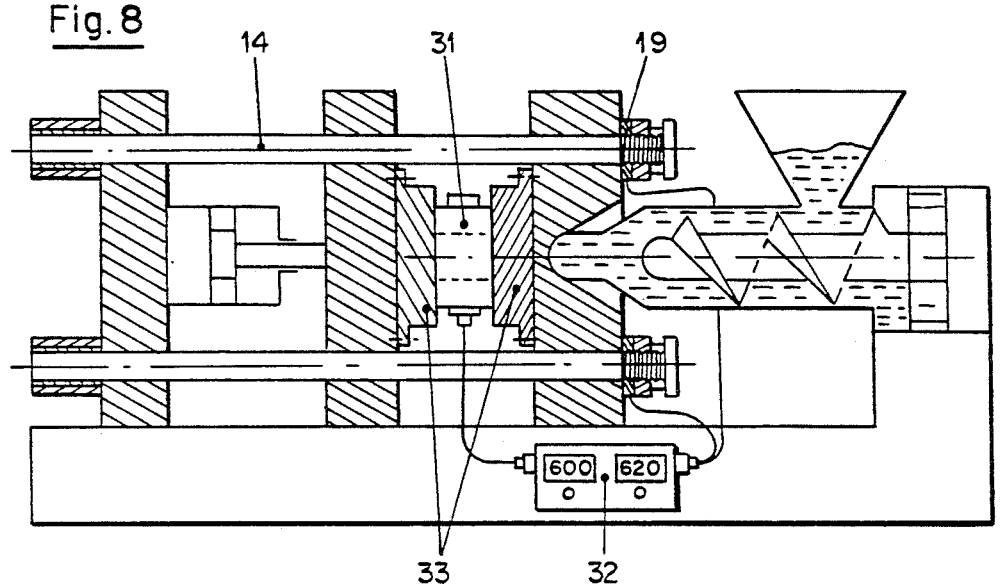
FIG. 8 is a cross-sectional view of a calibration rig for the entire installation.

FIG. 8 shows a possible calibration rig with the calibrating sensor 31 of the measuring electronics 32, which are connected with the thin disk force sensor 19 between two clamping plates 33.

Figure 9:
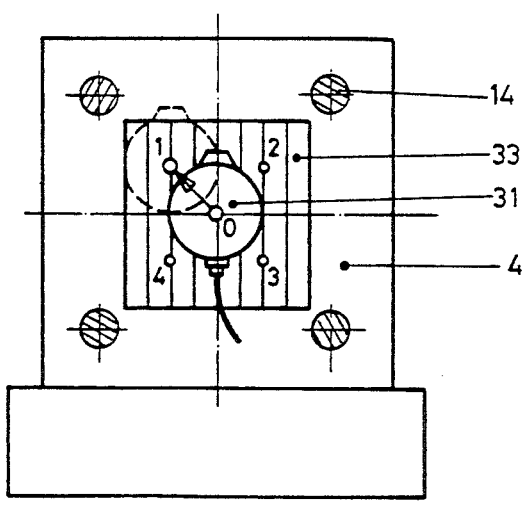
FIG. 9 is an end view of a calibration rig for the entire installation of FIG. 8.

In FIG. 9 it is indicated how, by means of different measuring positions 0, 1, 2, 3 and 4, the force of the individual beams may be measured as well as the total force.

The thin disk force sensor 19 according to the invention is based on piezoelectrics, because the cyclic operation of the machine allows simple zeroing before every measuring stroke. The piezo-crystal disks are of quartz, though in many cases piezo-ceramics may be better. Other sensor techniques like strain gauging, thin film, piezoresistance or capacitance may also be applicable for a thin disk force sensor concept. With regard to reliability, however, the piezoelectric approach is the technology of choice for thin disk force sensors according to the invention, by virtue of the simple signal outputs. Moreover, the piezoelectric concept allows very simple impedance transformers/amplifiers 29, which in miniature versions can be fitted straight into the connection part 30. The connecting line from the connection part 30 to signal processing can then be via a normal cable line.

For calibrating the installation, a calibrating sensor 31 is fitted between the clamping plates 33 and connected to the measuring electronics 32. With the calibrating sensor 31 centered exactly on position 0, the four beam sensors must give exactly equal values. If they do not, internal deformations and misalignments or unequal clamping lengths must be present; these must be corrected.

To localize divergent beam loadings further, the calibrating sensor may be positioned in steps to different positions 1, 2, 3 and 4.

In conjunction with the calibrating sensor 31, the thin disk force sensors allow proper verification of the overall state of the machine. This should be included in the servicing plan of the injection molding machine as preventive maintenance.

Equipping the machine with thin disk force sensors according to the invention will enable its serviceability to be verified at regular intervals, so that the costs of their procurement can be recovered within a reasonable time. The beam force measuring system according to the invention, with thin disk force sensors and appropriate evaluation electronics, allows the machine to be operated optimally and keeps the limits under continuous verification. This is especially true where molds are stressed off-center. The beam force measuring system according to the invention thus provides completely monitored operation, ensuring moldings of unvarying high quality. Furthermore it makes possible careful periodic monitoring of the mechanical state of the entire machine installation.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. Beam force measuring system for a cyclically operating machine having a plurality of beams secured to a force diverting part of the machine by a respective fastener and which is subject to cyclic forces comprising:

a force sensor to be mounted to said beam between said force diverting part and a respective fastener; said force sensor including a metal disk having the dimensions of a normal washer, into which at least one disk-shaped measuring element is welded under mechanical preload.

2. Beam measuring system according to claim 1 wherein said measuring element, weld and metal disk having a common planar surface, together yielding an exactly defined force paralleling between metal disk and measuring element.

3. Beam force manuring system according to claim 1, wherein the measuring elements inserted in the metal disk consisting of at least one piezo-crystal disk, an electrode and at least one cover disk.

4. Beam measuring system according to claim 3 including two piezo-crystal disks consisting of quartz or a piezo-ceramic.

5. Beam force measuring system according to claim 1, wherein thin disk force sensor includes a connection part which houses an impedance transformer/amplifier arrangement.

6. Beam force measuring system according to claim 1 wherein said machine is an injection molding machine and said beams are tie bars.

7. A method of verifying the state of a cyclically operating machine having a plurality of beams secured to a force diverting part of the machine and which is subject to cyclic forces comprising:

mounting a force sensor to each beam;

positioning a calibration sensor at various positions in a plane transverse to said beams;

monitoring signals from said force sensors and said calibration sensor; and determining the state of said machine from said monitored signals.

8. Beam force measuring system for a cyclically operating machine having a plurality of beams secured to a force diverting part of the machine by a respective fastener and which is subject to cyclic forces comprising:

a force sensor to be mounted to said beam between said force diverting part and a respective fastener; said force sensor being a disk having a height which is a fraction of the height of said fastener and including a solid annulus and a top disk joined together tightly and having openings with measuring elements in the openings.

9. Beam force measuring system according to claim 8, wherein the measuring elements are preassembled units fitted into disk force sensors of various dimensions.

10. Beam force measuring system for a cyclically operating machine having a plurality of beams secured to a force diverting part of the machine by a respective fastener and which is subject to cyclic forces comprising:

a force sensor to be mounted to said beam between said force diverting part and a respective fastener; and a mating member connecting said beam and said fastener for fixing the relative axial positions of said beam and said fastener.

* * * * *